United States Patent
Sperry

[15] 3,687,370
[45] Aug. 29, 1972

[54] LIQUID MIXING AND DISPENSING APPARATUS

[72] Inventor: Charles R. Sperry, Providence, R.I.

[73] Assignee: Instapak Corporation, Darien, Conn.

[22] Filed: Jan. 18, 1971

[21] Appl. No.: 107,023

[52] U.S. Cl. ................239/112, 239/117, 239/414
[51] Int. Cl. .........................................B05b 15/02
[58] Field of Search......239/106, 112, 117, 118, 409, 239/411, 412, 414, 417.3, 123, 410

[56] References Cited

UNITED STATES PATENTS

| | | | |
|---|---|---|---|
| 3,144,210 | 8/1964 | Levy | 239/116 X |
| 1,332,544 | 3/1920 | Davis | 239/411 |
| 3,263,928 | 8/1966 | Gusmer | 239/414 X |
| 3,291,396 | 12/1966 | Walter | 239/355 X |
| 3,504,855 | 4/1970 | Volker | 239/112 |
| 3,417,923 | 12/1968 | Carlson | 239/112 |

Primary Examiner—M. Henson Wood, Jr.
Assistant Examiner—John J. Love
Attorney—Siegel and Geren

[57] ABSTRACT

An apparatus for mixing and spraying or dispensing two liquids, such as liquid organic resins and polyisocyanates which react to form a polyurethane foam. The apparatus comprises a gun and related equipment and includes a reciprocally mounted valving rod in the gun which during its movement is bathed in a third liquid which assures the easy movement of the rod. In the case of the organic resin and polyisocyanates, the third liquid which is known as "cellosolve" solvent prevents the reaction of the reagents thereby preventing the formation of polyurethane foam within the dispensing apparatus which formation would inhibit the movement of the valving rod. The valving rod is such that the free end thereof controls the on/off flow of the two liquids into a mixing chamber.

10 Claims, 3 Drawing Figures

Patented Aug. 29, 1972
3,687,370
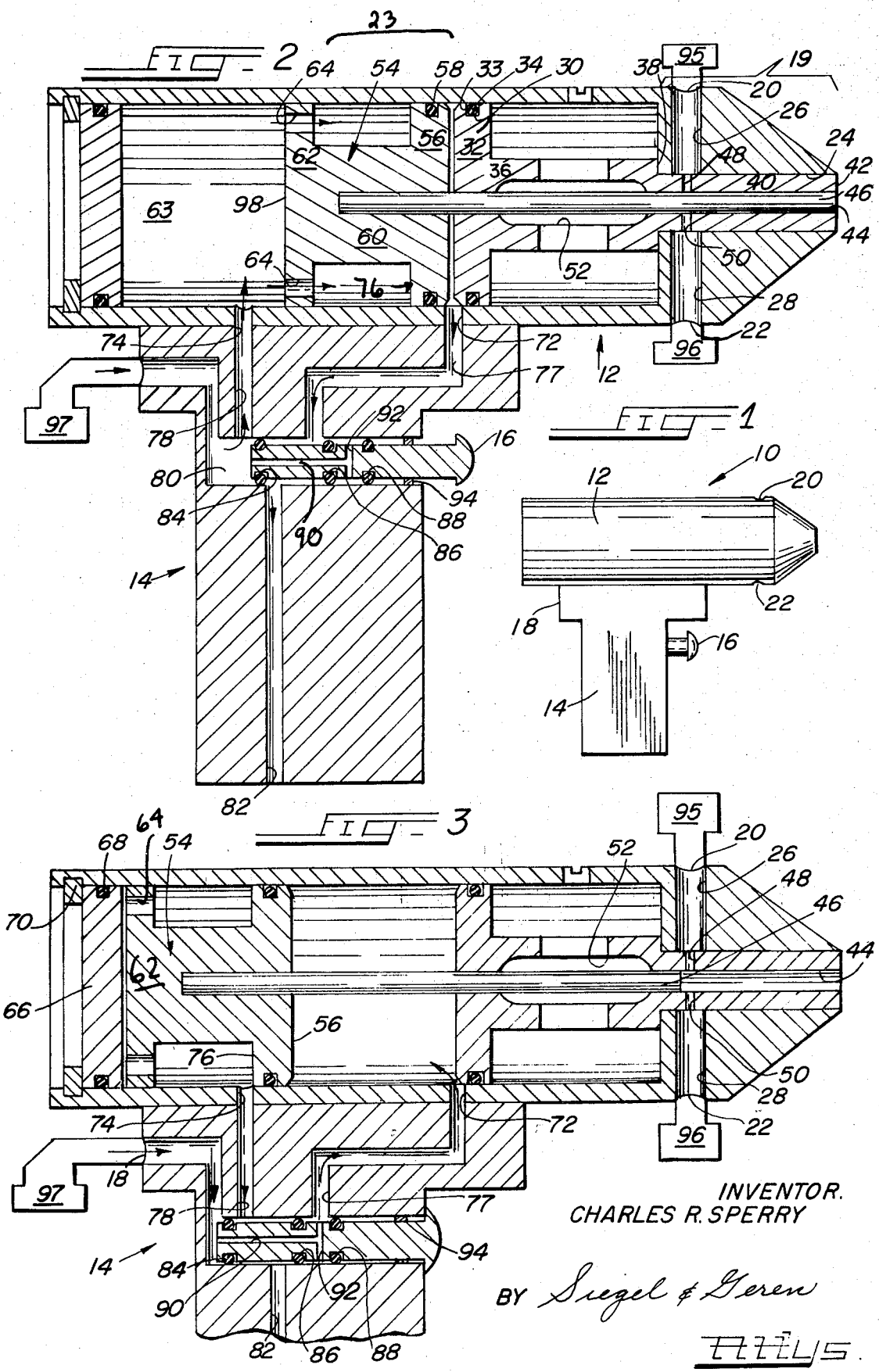
INVENTOR.
CHARLES R. SPERRY
BY Siegel & Geren
ATTYS.

LIQUID MIXING AND DISPENSING APPARATUS

BACKGROUND OF THE INVENTION

This invention relates to an apparatus for mixing and dispensing a plurality of liquids; and in particular is related to an apparatus for mixing and dispensing of the reactants for forming polyurethane foam.

An apparatus for producing a uniform homogenous mixture of a plurality of liquids has been in great demand. In particular, the preparation of polyurethane foams requires the uniform mixing of liquid organic resins with polyisocyanates; moreover, it is particularly desirable to dispense this isocyanate-resin mixture into a receptacle, for example, a package, before it has reacted to form the polyurethane foam. This is desirable, for example, when attempting to build up the foam structure around some object as in packaging. One particular problem with the handling of the polyurethane foam material is that the organic resin and isocyanate tend to react relatively rapidly and can foam within the various passageway in the dispensing apparatus and then the foam is most difficult to remove.

Considerable effort has been spent in attempting to develop an apparatus which would provide the desired homogenous mixing and which would avoid the problem of the foaming within the apparatus. It will be appreciated that when the foam sets-up, the moving parts may become jammed and difficult to move or dislodge which in turn will necessitate higher operating forces; furthermore, such foaming can block the passageways through which the foam or reactants pass thereby inhibiting the flow of the materials within or out of the apparatus. In the extreme, the passageways do become blocked within a relatively short time.

U.S. Pat. No. 3,263,928, "Apparatus for Ejecting a Mixture of Liquids" issued Aug. 2, 1966, discloses a gun-type apparatus for mixing and dispensing a plurality of liquids which is particularly suitable for use with polyurethane foams. The apparatus disclosed in the patent represents an improvement over the patentee's previous invention as disclosed in U.S. Pat. No. 2,890,836 wherein substantially complete air purging of the mixing chamber was provided upon the discontinuance of the operation of the gun. In U.S. Pat. No. 3,263,928 the patentee has provided a mixing chamber which is cylindrical in shape and through which there is a valving rod of about the same diameter as the chamber. When the valving rod is in the retracted position, the pressurized liquids enter the mixing chamber from their respective sources and the mixed liquids then exit from the front of the gun. When the valving rod is moved forwardly, it closes off the entrance ports and scores or mechanically abrades the surface of the mixing chamber so as to remove any of the mixture therefrom and prevent the hardening and jamming of the valving rod. The valving rod is moved forwardly until a small end portion protrudes from the front end of the gun. An arrangement is provided at the front end of the gun whereby compressed air is directed along the front of the valve housing for the purpose of cleaning the front end of the spray apparatus. This was provided, principally, to clean the protruding end portion of the valve rod. Thus, any accumulation of deposits of spray materials about the outlet of the spray equipment was to be avoided. It will be understood that had the patentee not taken that approach, the spray materials could harden on the protruding end portion of the valve rod thereby making it extremely difficult to retract the valving rod for the next spraying operation. In addition, there is some foam hardening in the mixing chamber, even in the form of a thin film. All of these provisions, not withstanding very high pressures, are still necessary to unseat the valving rod from its closed position. Furthermore, these arrangements required another compressed air line to be attached toward the front end of the gun in addition to the air lines necessary in order to move the valving rod back and forth.

The gun as taught in said patent has had the practical drawbacks as mentioned above which include the requirement of the additional air line for the cleaning of the gun and the high forces required to unseat the closed valving rod. In operation a frequent cleaning cycle has been required.

SUMMARY OF THE INVENTION

By virtue of this invention there is provided an apparatus for mixing and dispensing a plurality of liquids and in particular for mixing and spraying or otherwise dispensing polyurethane foam. The apparatus is formed in the general shape of a gun within the barrel of which is provided a reservoir which is filled with a material such as cellosolve solvent that prevents the reaction of the polyurethane foam precurser materials. In addition, a lubricant may also be provided in said reservoir. The flow of the liquid reactants is controlled by a valving rod, the forward portion of which is bathed in a material such as cellosolve when the rod is in the retracted or open position; in the closed position the coated rod passes into the mixing chamber and the front end of the rod may be flush with the front end of the gun. Coating of the rod and passageway prevents the formation of the foam within the passageway thereby eliminating the problem of clogging or jamming of the valve rod, or closing of the passageways by the formation of the foam in situ. Since foaming within the mixing chamber is prevented, the forces required to move the valving rod to permit the mixing and dispensing of the reactants are significantly reduced. Moreover, by preventing the reaction, only one air line is required to move the valve rod and the second air line of the prior art has been eliminated. The elimination of this air line thus provides a more easily handled apparatus. More importantly my apparatus is readily used in intermittent polyurethane foam dispersing without the need for clean-up at short intervals.

BRIEF DESCRIPTION OF THE DRAWINGS

FIG. 1 is a side view showing the outer configuration of the gun of this invention;

FIG. 2 is a cross-sectional view showing the inner mechanism of the present apparatus in the closed condition; and FIG. 3 is a cross-sectional view similar to FIG. 2 with the exception that the apparatus is in the dispensing condition.

DESCRIPTION OF THE PREFERRED EMBODIMENTS

Turning now to the figures, a gun 10 generally is shown which comprises two basic assemblies: the barrel assembly 12 and the handle assembly 14. The handle assembly is provided with an actuating button or trigger 16 and compressed air inlet 18. A pair of ports for the entry of the organic resin and isocyanate are provided in the forward section 19 of the barrel assembly 12. In FIG. 1, the ports 20 and 22 are shown aligned in a vertical plane. However, it will be understood that the ports may also be aligned in the horizontal plane as well as their associated passageways as shown in FIGS. 2 and 3. From FIG. 2 it can be seen that the rearward portion 23 of the barrel 12 is essentially a hollow thin-walled cylinder. The forward section 19 could be considered as a solid frusto-conical section having a bore 24 coaxial with the longitudinal axis thereof which bore 24 opens into the rearward cylindrical section 23. A second set of passageways 26 and 28 are provided which extend from the ports 20 and 22 and intersect the central bore 24.

A generally T-shaped flanged reservoir forming member 30 is disposed within the barrel 12. The member 30 has a flange or head section 32, the outer diameter of which is approximately equal to the inner diameter of the rearward cylindrical section 23. An annular groove 33 is provided about the periphery of the head section 32 and an O-ring 34 is disposed therein. Thus when the member 30 is in position, a seal is created on the inner periphery of the cylindrical section 23. Extending forwardly from the head section 32 is a shank portion which comprises two sections of reducing diameter. The first intermediate section 36 has a diameter greater than the diameter of bore 24 so that when the member 30 is in place the shoulder 38 will abut or bottom out on the front inner surface of the cylindrical section 23. Extending forwardly from the intermediate section 36 is a forward reduced section 40. The outer diameter of this section is slightly larger than the diameter of the bore 24 thus when section 40 is inserted into the base a pressfit seal is created. The length of the section 40 is such that when the shoulder 38 abuts the front surface of the inner cylinder, the forward end 42 if the section 40 is positioned in the forward end of the frustro-conical section 19.

The reservoir forming member 30 is provided with an axial bore 44 through which a valving rod 46 is adapted to move. In the forward reduced section 40 there is further provided a pair of passageways 48 and 50 which provide communication between the passageways 26 and 28 and the portion of the bore 44 in the forward shank section 40. When the valving rod is in the retracted position (as is illustrated in FIG. 3), fluids will flow from port 20 through passageway 26 through the passageway 48 and into the bore 44; similarly, a second fluid will flow from the inlet port 22 through the passageway 28 through the passageway 50 and into the bore 44.

Returning to FIG. 2 and continuing with the description of the T-shaped member 30, it will be seen that the bore 44 also extends through the head section 32 and a slot 52 is provided which extends diametrically clear through the intermediate shank portion 36. Some portion of the valving rod 46 is at all times disposed within the slot 52 and the forward portion of the rod 46 is always within the bore 44 in the forward section 40.

When the member 30 is in place, an annular chamber is created which is defined by the inner diameter and forward inner surface of the cylindrical section 23, by the outer diameter of the intermediate shank section 36 and the front facing surface of the head 32. This annular or ring-like space is continuous and communicates with the space within slot 52. In operation the annular space and slot are filled with the reaction preventative fluid, cellosolve so the portion of the rod 46 which is within the slot 52 is always exposed and bathed in cellosolve. Thus, as the valving rod 46 travels forwardly and rearwardly during its movement, substantially the entire rod is bathed in cellosolve.

The rearward end of the valving rod 46 is mounted to a pneumatically moveable piston 54, the movement of which controls the movement of the rod 46. The periphery of forward end 56 of the piston sealingly and slideably engages the inner surface of the cylindrical section 23. To further assure sealing engagement, an O-ring 58 is disposed in an annular groove within the periphery of the forward end 56. The center section 60 of the piston 54 is of reduced diameter and the rearward end 62 has a diameter approximately that of the inner diameter of the section 23. A plurality of passageways 64 are provided in the rearward section 62 for communication between the space 63 behind the rearward section 62 and an annular space formed by the piston, its reduced center section 60 and the inner surface of the cylindrical section 23. In its forward movement, the front end of the piston 54 abuts the rearward end of the T-shaped reservoir forming member 30. In that configuration, as shown in FIG. 2, the forward end of the valving rod 46 is positioned in the forward end of the front reduced section 40.

Turning now to FIG. 3, it will be seen that the piston 54 is in the rearward retracted position. A back sealing and stop plate 66 is mounted to the rearward end of the barrel 12 and an annulus is provided in the outer diameter of the plate 66 with an O-ring 68 being disposed therein. When the back plate 66 is in place, the rear bore of the cylindrical section 23 is completely sealed. A locking ring 70 which engages an under cut groove is provided rearwardly of the sealing plate 66 so as to hold the sealing plate in position. As is seen in FIG. 3, the forward end of the valving rod 46 is retracted to a position rearward of the passageways 48 and 50 but slightly forward of the front end of the slot 52. If the valving rod 46 were permitted to retract into the slot 52, it may be difficult to reinsert the front end of the rod 46 in the bore 44. However, within that limitation it will be appreciated that it is desirable to expose the largest possible surface of the valving rod 46 to the cellosolve within the reservoir. However, this must be balanced against the problems of guiding the rod 46 into the bore 44.

As indicated above, the piston is moved forwardly and rearwardly pneumatically; however, it will be appreciated that hydraulic means or other similar means for moving the valving rod and/or piston forwardly to the closed position or rearwardly to the open and retracted position can be used.

Returning now to FIG. 2, the pneumatic mechanism for moving the valving rod 46 will be described. As is seen, two ports 72 and 74 are provided in the bottom of the cylindrical section 23. These ports and the piston 54 are arranged such that the port 72 is always in a position forward of the front end 56 of the piston 54.

The rearward port 74 is positioned so that it will always be rearward of the back surface 76 of the forward section 56. The principle of operation is readily understood in that in order to move the piston and hence valving rod rearwardly, compressed air is flowed into the port 72 which causes the piston 54 to move rearwardly. As the piston moves rearwardly, gas or air caught between the sealing plate 66 and the back end 62 of the piston 54 can flow through the venting ports 64 and hence out through the port 74. Referring back to FIG. 3, in order to move the piston 54 and valving rod 44 forwardly, the air flow is reversed and air is introduced through the port 74 thus exerting force on the back surface 76 of the front end 56 of the piston thereby moving the piston forwardly. This piston is permitted to move forwardly until the front end 56 abuts the rear end of the T-shaped member 30.

The handle 14 provides the mechanism for controlling the movement of the compressed air so as to accomplish the desired movement of the piston and hence the valving rod. This mechanism includes the three principal parts of the handle 14, the air inlet coupling 18 and the actuating button 16.

Again referring to FIG. 2 and the handle assembly 14, there is provided a pair of passageways 77 and 78 which are aligned with the ports 72 and 74. The lower end of both of these passageways 77 and 78 communicates with a central passageway 80 in which the actuating button 16 moves. The air inlet coupling 18 provides communication between a source of compressed air and the passageway 80. An atmosphere venting passageway 82 is provided in the lower portion of the handle and is positioned to intersect the passageway 80 so that in all of the various arrangements, air which is exhausted from the cylindrical section 23 by the piston 54 vents to atmosphere therethrough. This is necessary in order to prevent a build-up or back pressure which would inhibit the movement of the piston. The actuating button 16 is a double purpose member, the first purpose of which is to actuate the mechanism for moving the valving rod and the second purpose of which is to provide passageways for the mechanism. As can be seen, the button 16 is provided with three annular grooves. One annular groove 84 is located at the rearward end of the button 16, while the remaining grooves 86 and 88 are located approximately midway between the forward and rearward ends of the button 16. An axial passageway 90 extends from the rearward end of the button 16 to a point intermediate the two midway positioned annular grooves 86 and 88. A cross hole or passageway 92 is drilled diametrically through the button 16 and intersects the passageway 90.

A retaining washer 94 is mounted to the button 16 so as to create an interference or jamming fit between the passageway 80 and the button 16 thereby preventing it from being expelled or pushed from the passageway 80 by the virtue of air pressure. Disposed within each of the annular grooves 84, 86 and 88 is an O-ring which is adapted to a seal the particular passageway which is created.

Turning now to the operation of the gun, when used in polyurethane formation, a pressurized source of liquid organic resin 95 is coupled to the port 20 and a pressurized source of isocyanate 96 is coupled to the port 22. A source of compressed or pressurized gas or air 97 is coupled at 18 to the central passageway 80. In the closed position as seen in FIG. 2 the valving rod 44 extends past the ports 48 and 50 thereby preventing the flow of the resin and isocyanate. In that configuration, air flowing from the coupling 18 flows into the central passageway 80 and pushes the button 16 forwardly such that the O-ring in the groove 84 sealingly engages the surface rearward of the atmosphere venting passageway 82 and forward of the inlet passageway 78. Thus the gas flows from the passageway 80 into the passageway 78 through the port 74 against the back surface 98 of the piston 54 through the ports 64 and against the back surface 76 of the forward end of the piston 54. In this configuration, the front end of the piston bottoms out or abuts the rear end of the T-shaped member 30. Gas which was caught between the front end of the piston 54 and the rear end of the chamber forming member 30 is expelled through the port 72 and passageway 77. When the exhausted gas reaches the passageway 80, it flows through an annular space which is created about the button 16 by the O-ring in the rearward groove 84 and an O-ring in the central groove 86. The O-ring in the groove 86 contacts the surface forward of the passage 77. Thus, as is seen by the arrows, the exhausted gas will go around the button 16 and vent to the atmosphere through the passageway 82. In this position, the central portion of the valve rod 46 is bathed in the cellosolve disposed within its reservoir. In order to actuate the gun for mixing and spraying, the button 16 is retracted as shown in FIG. 3. When the button is retracted, the O-ring in the rearward groove 84 is caused to engage the surface rearward of the passageway 78 thereby sealing the passageway 78 from the inward flow of air. Air then flows from the coupling 18 into the passageway 80 and from there into the central passageway 90 within the button 16. When the button 16 is in the rearward position, the O-ring in the groove 86 then contacts the surface rearward of lower end passageway 77 and forward of the passageway 82. The O-ring in the groove 88 still contacts the surfaces forward of the lower end of passageway 77. The air then flows down the passageway 90, through and out from the cross hole 92 and into the passageway 90, through and out from the cross hole 92 and into the passageway 77. From the passageway 77, the compressed air flows through the port 72 and from there against the front surface of the piston 54. This causes the piston 54 to move rearwardly and thus causes the gas between the piston 54 and the sealing plate 66 to flow outwardly through the port 74 and passageway 78. The exhausted gas then reaches the central passageway 80 and is prevented from flowing rearwardly by the O-ring in the groove 84 and from flowing forwardly by the O-ring in the groove 86. However, the gas can flow in the annular chamber formed about the button 16 by the O-rings and the passageway 80 and from there vent to atmosphere through the passageway 82.

Turning now to the inflow of the liquid organic resin and isocyanate, it can be seen that as the forward end of the rod 46 is retracted and moved past the ports 48 and 50 there will be an inflow of the pressurized resin and isocyanate. Since the front end of the rod is not retracted into the slot, the back end of the bore 44 remains closed. Therefore, when the isocyanate and resin flow into the bore 44, they will mix and, due to the respective pressures, will be forced or sprayed outwardly from the end of the bore 44. Depending upon the pressures, the ejection from the forward end can be a droplet-like spray. Furthermore, since the apparatus is in the form of a gun, the spray can be directed where desired. In the retracted position as seen in FIG. 3, almost the entire forward portion of the valving rod 44 is immersed in cellosolve. When it is desired to stop the spray, either the operator or some mechanical means, releases the button 16 and the air pressure thus causes the button to move forwardly into the rest position. As this occurs the piston and the valving rod move forwardly and the valving rod closes off the entry ports 48 and 50. The rod thus forces the remaining isocyanate and resin outwardly and the cellosolve prevents any reaction from occuring between any remaining isocyanate and urethane within the gun 10. This also acts to prevent any reaction at the tip or front end of the gun. Thus when it is desired to spray again and the valving rod is easily retracted since there is no build-up or hardening of urethane foam, the strength of which must be overcome before the valving rod can be retracted.

As indicated above, one of the two primary reactants in the polyurethane foam making process is a liquid organic resin which is sometimes referred to as a polyol. These materials can be selected from the group consisting of polyethers, polyesters, polythioethers, polyesteramides, alkylene glycols and polyisocyanate modifications thereof, which materials are characterized by a molecular weight of greater then 500 and which have at least two reactive hydroxyl groups per molecule. Examples of the foregoing are poly (oxyethylene) glycols and poly (oxypropylene) glycols, or copolymers of these materials which collectively may be referred to as poly (oxyalkylene) ethers.

The other principal reactants in the polyurethane foam making reaction are aromatic or aliphatic polyisocyanates. This may also include substituted aromatic polyisocyanates. Representative examples of these materials include 2,4-toluene diisocyanate; 2,6-toluene diisocyanate; ethylene diisocyanate; ethylidene diisocyanate; propylene-1,2-diisocyanate; butylene-1,2-diisocyanate; hexylene-1, 6-diisocyanate; cyclohexylene-1, 2-diisocyanate; M-phenylene diisocyanate; 3,3'-dimethyl-4,4'-biphenylene diisocyanate; 3,3'-dimethoxy-4,4'-ciphenylene diisocyanate; 3,3'-diphenyl-4,4'-biphenylene diisocyanate; 4,4'-biphenylene diisocyanate; 3,3'-dichloro-4,4'-biphenylene diisocyanate; triphenylmethane triisocyanate; 1,5 - naphthalene diisocyanate, or polyisocyanates in a blocked or inactive form such as the bisphenyl carbamates of tolune diisocyanate, etc.

Turning now to the reaction preventative liquid, there are a number of commercially available liquids known by the trade name, cellosolve, that are manufactured and sold by Union Carbide for preventing the reaction of liquid organic resins and polyisocyanates. In the manufacture of the polyurethane foam the particular cellosolve which has been found to be most effective is ethylene glycol monoethyl ether. Other of the cellosolves can be used but are not as effective. Of course, the general characteristics of the material must be such that it inhibits or prevents the reaction between the fluids being mixed and is compatible with the materials in which the gun is manufactured. It is recognized that if the gun is manufactured from polyvinyl chloride that the acetate version of the cellosolve will react therewith and is thus undesirable.

In the experimental models, the cellosolve is injected into the chamber before the gun is completely assembled. This is done as follows: before the retaining ring 70 and sealing plate 66 are fixed in position but after the piston and valving rod have been inserted into the barrel 12 such that the forward end of the rod 46 is somewhere in the slot 52, a hypodermic needle (connected to a supply of cellosolve) is passed down the bore 44 of the forward section 40 and into the slot 52. At this point the cellosolve is pumped into the annular chamber via the slot 52 until the chamber is filled. Then the assembly of the gun is finished by pushing the rod 46 into the bore 44 in the forward section 40. It will, of course, be appreciated that in the commercial embodiment, a valve or operable port can be provided in the wall of the cylindrical section 23 so as to permit the chamber for the cellosolve to be filled after assembly.

It will be appreciated that numerous changes and modifications can be made to the embodiment described herein without departing from the spirit and scope of the invention.

What I claim is:

1. An apparatus for mixing and dispensing a plurality of liquids which comprises:
   a. housing means;
   b. a mixing chamber in said housing means having
      i. an outlet at its forward end, and
      ii. a plurality of entrance ports upstream of said outlet, each for introducing fluid into said chamber;
   c. a valving rod for opening and closing said entrance ports received by and slideably engaging said mixing chamber and reciprocally movable therein, the forward end of said rod being movable to an open position rearward of said entrance ports and movable to a closed position forward of said entrance ports;
   d. means for moving said valving rod;
   e. means rearward of said mixing chamber into which said valving rod is retractable, said means defining a reservoir adapted to hold material for cleaning said valving rod; and
   f. means for introducing cleaning material into said reservoir.

2. The apparatus as claimed in claim 1 wherein said means for moving said valving rod includes means defining a cylinder and a piston reciprocal within said cylinder and wherein the rearward end of the valving rod is mounted to said piston for movement therewith.

3. The apparatus as claimed in claim 2 wherein pneumatic means are provided for moving said piston.

4. The apparatus as recited in claim 3 wherein said pneumatic means include:
   a. a source of compressed air, and
   b. a handle and trigger assembly associated with said cylinder and said source of compressed air so that upon actuation of the trigger, the piston is caused to move rearwardly and upon release of the trigger the piston is caused to move forwardly.

5. The apparatus as recited in claim 1 wherein the reservoir includes a slotted member for guiding said valving rod in its reciprocating movement within said reservoir.

6. The apparatus as recited in claim 5 wherein at all times at least a portion of said rod is disposed within said slotted member.

7. The apparatus as defined in claim 1, wherein in the closed position the forward end of the valving rod is flush with the outlet end of said mixing chamber.

8. The apparatus as recited in claim 1 wherein a cleaning material is disposed within said reservoir and a portion of the valving rod within the reservoir is contacted by said material.

9. The apparatus as recited in claim 8 wherein said reaction preventative material is ethyleneglycol monoethyl ether.

10. The apparatus as recited in claim 1 and in combination therewith:
 a. a pressurized source of liquid organic resin in communication with at least one entrance port;
 b. a pressurized source of liquid isocyanate in communication with at least one other entrance port; and
 c. pneumatic means for reciprocating said valving rod which means include a source of compressed air.

* * * * *